Patented Oct. 1, 1946

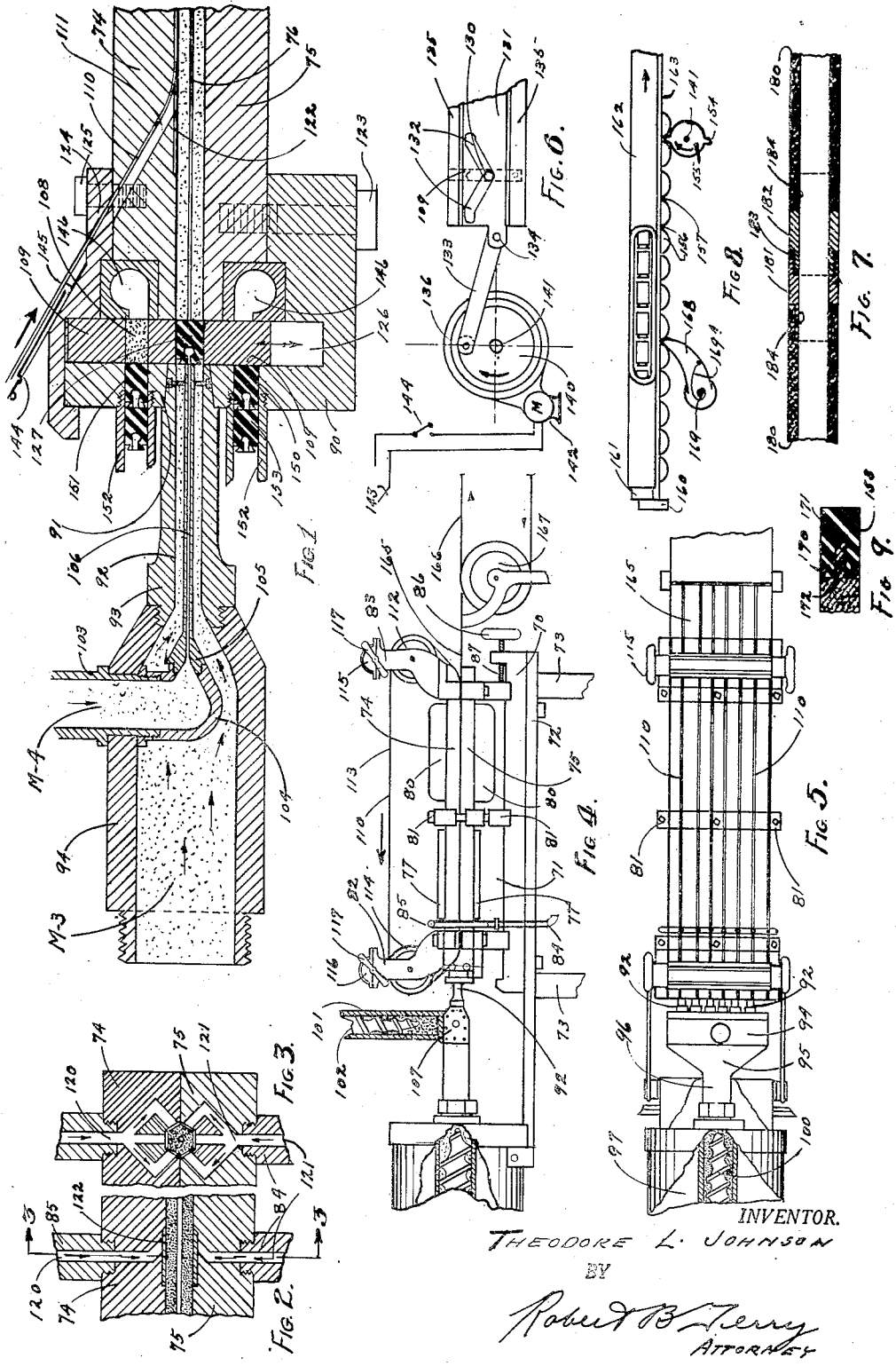

2,408,398

UNITED STATES PATENT OFFICE 2,408,398

MULTIPLE EXTRUSION

Theodore L. Johnson, St. Louis, Mo.

Application July 24, 1943, Serial No. 496,258

20 Claims. (Cl. 18—13)

This invention relates to improvements in multiple extrusion, and more particularly to methods of and apparatus for producing by extrusion processes, certain composite articles characterized by dissimilar body and core portions, for example, lead pencils and any other composite products characterized by differing internal and external elements, at least certain of which are formed of setting plastic materials.

Heretofore, as far as is known to this applicant, methods of forming articles or products of an attenuated nature, and involving the use of extruded thermo-plastic or thermo-setting materials, have been confined to the production of articles of homogeneous nature by extrusion of a single plastic material. There exists a need, and may be developed numerous additional market possibilities, for forming entirely by extrusion methods a great variety of articles by compound extrusion, i. e., a method or process through the practice of which dissimilar plastic materials may be extruded internally or externally of each other. The present invention accordingly has a major objective, of perfection of compound extrusion practices.

Yet another object of the invention is attained in an improved method and arrangement of apparatus for applying to a linearly extruded product, a permanent inset or insert member, bonded say to an elongate body of plastic or intimately united therewith as an incident to the extrusion process. One example of such application is found in the provision of automatic means to be described, for introducing an eraser element molded into union with the body of a lead pencil; another example is objectively realized in the introduction, say, of metal pipe connections or the like, into lengths of plastic tubing, whereby the latter may be formed by a continuous extrusion process complete with couplings or connections ready for assembly at the place of usage. Further numerous examples of possibilities within the present instructions will suggest themselves in keeping with the present object.

Still another object of the invention is attained in an improved arrangement for applying a coating material externally to an elongate extruded plastic product or article, for example, a lubricant to facilitate passage of an extruded body of plastic through a forming chamber; the application say of a plastic finish coating, or an enamel or lacquer to a body or article of elongate or other desired practical shape.

A still further and important object of the invention is attained in improved equipment for severing exact lengths of linearly extruded material, to assure delivery of articles of predetermined finish dimensions.

The foregoing and numerous other objects will more clearly appear from the following detailed description of certain apparatus and methods of production realizable through the use thereof, particularly when considered in connection with the accompanying drawing, in which:

Fig. 1 is a fragmentary vertical sectional elevation of a preferred form of compound extrusion apparatus adapted particularly for use in the manufacture of lead pencils;

Fig. 2 is a fragmentary longitudinal sectional view through a portion of the forming or molding passageway of the device of Fig. 1;

Fig. 3 is a vertical, transverse, sectional elevation, as viewed along the staggered plane indicated at 3—3 in Fig. 2;

Fig. 4 is a single line drawing, somewhat diagrammatic in nature, and showing in general arrangement, a side elevation of a machine embodying a plurality of the assemblies of Fig. 1, a magazine feed arrangement for insert elements as shown by Figs. 1 and 8, being omitted from this figure in the interest of clearness;

Fig. 5 is a top or plan view of the apparatus of Fig. 4;

Fig. 6 is a fragmentary side elevation of an assembly utilized in connection with the structure of Fig. 1, for operating a cutoff gate and feed structure employed for the insertion of inset members, such as erasers introduced in the line of flow of material to form pencil bodies, this figure showing further a diagram of a control circuit constituting a part of a flow gauge assembly;

Fig. 7 is a fragmentary sectional view taken lengthwise through a plastic tube and coupling assembly, such as may be produced by the assemblies of Figs. 1, 4 and 5;

Fig. 8 illustrates an arrangement utilized in the production of a composite elongate structure characterized by an inset element or elements, for providing an intermittent feed for such elements, for examples, the couplings of a plastic tubing or pipe, or the eraser elements of an eraser-pencil combination, and Fig. 9 is a fragmentary longitudinal sectional view of an eraser and the head end of a plastic-body pencil, showing a preferred manner of eraser assembly.

Referring now to the drawing, the assembly shown by Figs. 4 and 5 may constitute an attachment for any standard extrusion machine, many suitable types of which are available to the trade, such as the extrusion machines manufactured by National-Erie Corporation of Erie, Pa. Since the extrusion machine is or may be conventional, and of itself forms no part of present improvements, only the discharge end of the extrusion chamber or casing 97, and extrusion screw 100, are shown. The casing structure of the extrusion machine, and connected parts of present structure may be jacketed (not shown) for a temperature control fluid or provided with electrical heating provisions (not shown) in any suitable or conventional arrangement.

In the interest of brevity of illustration and description, most of the various temperature, pressure, and flow-control instruments and gauges have been omitted since, except for those later to be described, they are or may be of conventional and well known type. It is however importantly to be noted that, in the interest of provision for complete accurate visual information of the operator at all times, it is contemplated that the various temperature and pressure control expedients will be employed in connection with present apparatus similarly to those described and shown in my copending application relating to continuous molding, filed June 9, 1943, and bearing Serial No. 490,387.

Among the numerous practical realizations of the compound extrusion method heretofore described in part, and later to be described more fully, is the manufacture of so-called lead pencils, wherein the body or sheath of the pencil may be formed of one thermo-plastic or thermoplastic-containing material, and the writing core or "lead" may be formed of a dissimilar extruded material expressed while in plastic state from a suitable orifice.

Reference will now be made to Figs. 4 and 5, illustrating an assembly of apparatus for pencil manufacture. As will appear from Fig. 4, a preferred form of this assembly includes a stationary bed plate 70 on which is slidably disposed for a limited longitudinal movement, a base 71. The bed plate 70 and superposed structure are conveniently carried as by a table 72 provided with legs or other suitable subjacent supports 73.

The body of the apparatus mounted on support 71 includes, primarily, a passage-forming structure comprised of an upper half 74 and a lower half 75, each provided in the present instance, with a substantially semi-cylindrical longitudinal groove, the two grooves when adjacently disposed, serving to form a passageway 76 which constitutes a forming conduit for the plastic material extruded as hereinafter described. It is preferred, as shown by the present assembly, so to form the members 74 and 75 that each thereof comprises a plurality of grooves, and hence when paired in assembly, serve to form a plurality of the passageways 76. In the assembly of Fig. 4, the passage-forming structure is surrounded, or partly so, by a heating chamber 77 near the entrance end of the structure, and by preference with a cooling chamber 80 extending about the discharge end of the passage-forming structure. A threaded clamping device, indicated generally at 81, is employed to hold in assembly, the upper and lower half of the structure identified in part at least, by members 74 and 75.

At each end of the assembly there is carried on the structure described, a bracket projecting endwise of and upwardly from the body forming the several passages 76, one such bracket being indicated at 82 and the opposite bracket at 83, for a purpose later appearing. Disposed in a suitable location preferably as shown, along the passage-forming structure or body of the machine, is a conduit 84 which is provided with an upwardly extending branch portion 85, these serving with provisions later described, for the supply of a coating material to the body of plastic mix or the like extruded into and proceeding through the one or more passages 76.

Provision is made for manually displacing the support 71 and parts carried thereby, in a longitudinal direction on the bed plate 70, as through a hand wheel 86 provided with a threaded shank 87 the inner end of which (not shown) is rotatably positioned in, but axially secured to an end portion of member 71 and threaded through an upwardly projecting arm portion of member 70. As best appears from Fig. 1, the passage-forming structure is capped at its input end, by a closure member 90 provided with a tapered socket 91, with which interfits a similarly tapered end of a nozzle extension member 92 containing an entrance throat or nozzle proper 93. A plurality of the nozzle members 92 are provided as will appear from Fig. 5, and each of these is supplied with a material M3, which in pencil manufacture is thermo-setting or thermoplastic in nature and which will be supplied to the several members 92, in a multiple unit, from a manifold member 94. The manifold 94 is provided with a short tapered receiving throat 95 which is fed as by a receiving neck 96, and the latter attached as by a flange connection to the discharge end of an extrusion machine 97 provided with a screw 100. The machine 97 is or may be the National-Erie assembly earlier mentioned, although any suitable or conventional extrusion apparatus of sufficient capacity will serve this purpose.

Disposed to extend preferably vertically of the manifold element 94, is the second or auxiliary extrusion apparatus identified with a feed channel 101 and an extrusion screw 102, which is supplied from an extrusion chamber (not shown), the member 101 opening into a common secondary extrusion conduit 103 (Fig. 1) connected to which are the requisite plurality of elbow fittings 104 each provided with a detachable nozzle element 105. The several secondary nozzles 105 are each provided with an attenuated, finely-bored extension 106 which, as seen from Fig. 1, extends outwardly to the end of the extension member 92 beyond nozzle 93, and by preference, projects fully through the tapered joint-forming connection at 91. It will readily appear from Fig. 1 that the trend of the element 106, hence of the bore therein, is concentric or coaxial in relation to the passageway in member 92. It results from this structure that actual extrusion of material from member 106 of the secondary extrusion feed, occurs considerably later than, and beyond the time and zone of extrusion by nozzle 93 into member 92.

A number of advantageous cleanout facilities for the manifold assembly 94, and the several passage-forming elements therein, are provided for ease of access to all parts of the interior of the structure; for example, at each side of member 94 there is provided a removable cover plate 107 (Fig. 4).

Referring now more particularly to some of the features illustrated by Fig. 1, and the general method involved in extrusion practice identified therewith, it will now have appeared that the material M3 impelled under pressure by screw 100 through member 94, via each nozzle 93 and nozzle passage 92, will proceed through one of the openings or passages in a gate member 109, thence into passage 76. It is preferred, but not in all cases strictly necessary, that the setting plastic material M3 be permitted to cool or otherwise to set somewhat by the time it reaches the passage in gate 109, available thereto and later to be described. It results from this that the material indicated for reference as M4, upon being impelled first downwardly in passage 103, thence outwardly through nozzle member 105 and through the bore in member 106, will be extruded into the partly set, body-forming portion of the pencil or the like.

It may here be noted that, as to choice of materials, a thermo-setting plastic is admixed with a high proportion of finely comminuted wood flour together with asbestos fiber or other fibrous material. The plastic may also consist of a material of cellularly-expanded nature, the proportion of plastic being sufficiently low that the resulting pencil body will not warp, presents a smooth finish, and may easily be sharpened in conventional pencil sharpening devices, and so is also of such characteristics that it can readily be cut or shapened by knife.

Although the various and numerous possible compositions of matter suitable for body or sheath of a pencil, and others suitable for the core or lead, do not of themselves constitute any part of the presently claimed improvements, it may be noted for completeness and to provide a few examples, that the pencil sheath may be constituted as disclosed in Patent No. 1,937,103 to J. R. Thomsen, Nov. 28, 1933, and entitled Pencil sheath composition.

The material M4 from which results the so-called "lead" of the pencil will preferably consist of a high percentage of graphite or plumbago of predetermined texture and fineness according to grade of pencil desired. With this is admixed a suitable proportion of a self-hardening plastic or other material. To provide certain tried examples of suitable compositions, these may consist of mixtures of the general nature disclosed in Patent No. 1,937,105, Thomsen, issued November 28, 1933, and entitled Self-hardening graphite lead for pencils; the compositions of Thomsen are, however, modified, for applicant's purpose, to minimize or obviate the permanently flexible characteristic of Thomsen's products, by eliminating substantially all of those ingredients which make for flexibility of finished product. Applicant desires, after setting of the material forming the writing core, a relatively rigid core or lead, which may be attained as directed, and yet provide an easily extrusible material which is capable of forming into final position under reasonable pressures.

In the passage 76, in case a pencil of polygonal, say hexagonal section is desired, all or a certain defined portion of the length of passageway 76, is so formed as to provide three faces of the hexagon structure in member 75 and the additional three faces in a companion groove of member 74, this arrangement being suggested by the section of Fig. 3. The same arrangement will obviously apply equally to any other multi-sided structure, or any other polygonal section desired.

As a convenient adjunct to or step in the complete automatic or semi-automatic manufacture of lead pencils by compound extrusion, there is provided an arrangement for impressing on one of the faces of the body of the pencil body, suitable legends or indicia indicating grade, manufacturer's name, tradename, etc. Provision for this purpose is made in the present assembly through a series of endless tapes or bands, there being one such band indicated at 110 for each of the passages 76. The band enters the related passage through a sloping passageway 111, and moves in the direction of the arrow (Fig. 1). Each such band proceeds through and then emerges from the discharge end portion of the passage 76, whence it diverges from the now-formed pencil body and moves over a friction roller 112, journalled in the bracket 83, thence rearwardly above the machine, this returning pass of the band or tape being indicated at 113 and moving in the direction of the arrow (Fig. 4). The band thence moves over a companion friction roller 114, thence downwardly at an acute angle and again into the passage 111. In the multiple unit shown by Figs. 4 and 5, each pair of rollers 112 and 114 serve a plurality of the tapes or bands 110 as will readily appear from the top view of Fig. 5. It is a preference to provide each of the rollers 112 and 114 with a friction surface, and to control and to assure a carefully timed movement of the several tapes 110, there is provided a longitudinally ribbed roll 115 overlying the tapes and roller 112, and a similarly ribbed roller 116 overlying the roller 114. A friction control, operating through variation of spacing of the paired adjacent rolls, is provided on each bracket 82 and 83, and identified with control elements 117.

It is contemplated and entirely practical to derive the motion of the several tapes 110, each through the friction between the tape and the material M3 in the associated passageway 76, it being understood that the material in passage 76 remains under an appreciable pressure throughout the movement of the plastic through this passage. However, when operating at lower initial pressures and with certain alternate choices of materials, it may be desirable to power-drive the tapes or bands, as by roller 114 for example, whereby to impart, by means externally of the extrusion channels, a predetermined and fixed rate of movement to the several tapes 110. With this alternative, the roller 114 may be considered as a power drive element, operating through tension on the several tapes, to draw same into, thence through the several passageways 76.

In the manufacture of elongate articles such as lead pencils it is frequently desirable to make provision for application to the body of the article, of a coating material, this term being used in a broad and generic sense, to include, for example, a lubricant to facilitate passage of the plastic through the remainder of its forming passage, such as 76, whereby considerably to reduce the pressure necessary otherwise, for overcoming friction, to be maintained at nozzle 93 and rearwardly thereof in the course of flow; other coating materials include for example an enamel, tinted lacquer, paint or the like, and as a still further group of possibilities, a surface coating of yet an additional plastic material. In prevailing extrusion practice, lengths of forming passages beyond the nozzles are restricted, since excessive friction in a longer passage would require inordinate extrusion pressures. It results that many extruded articles are necessarily discharged while insufficiently set to be self supporting; hence the provision for application of a lubricant, chemically compatible with the plastic, enables a much longer forming passage and better physical integrity of the finished articles.

Provision for the application of desired coating materials may be made according to the arrangement shown by Figs. 2 and 3. Somewhat beyond the portion of passage 76 as shown by Fig. 1, for example in the zone lengthwise of passage 76 identified by conduits 84 and 85, the members 74 and 75 are each provided with a transverse conduit or passageway, indicated at 120 in member 74, and 121 in member 75. Each of the passages 120 and 121 is formed in the example shown, to provide three initially divergent branches, which thereafter are brought into converging relation as shown by Fig. 3 so that there are six passages or openings directed into the passageway 76, each of these six branch passages delivering substantially centrally of one of the hexagonal face portions of the body of plastic later resulting in the pencil body. It is further preferred so to form the inner terminal or mouth of the several branch passages that each thereof is deflected forwardly in relation to the line of flow in passage 76, say at an angle of 45 degrees, as clearly appears from Fig. 2.

It will now appear obvious as desirable to prevent the material under considerable pressure in the forming passageway 76, from finding an exit through the passageway 120 or 121, and to this end there are provided, one at the inner end of each branch passage, a spring check or gate element 122, a similar provision being noted at the inner end of passage 111 for tape 110. These are preferably light spring metal elements, each anchored as by welding or other suitable form of securement, at its end most remote from the free end which is in register with the several branches. It is a preference that the several fingers or check elements 122 be staggered somewhat along the passage 76 so as to avoid any possibility of interference with each other upon their opennig movement. As shown, it is preferred that each of the check members 122 be mounted in a recess of a size just sufficient to accommodate the individual element, whereby to avoid any restriction of the normal cross sectional passage area in the region of introduction of the coating material. It is a preference, of course, that the material introduced in accordance with the arrows shown by Figs. 2 and 3, through a single supply pipe 84, be maintained under a pressure safely exceeding the order of pressures obtaining in this region of the passage 76, so as to assure definiteness of flow direction.

Although the principal combinations and subcombinations of features thus far described will suffice for the production of elongate plastic articles in case, as in certain types of lead pencils, the articles are formed of indefinite stock lengths and separately cut to predetermined finished lengths, it will nevertheless appear advantageous, first to gauge and secondly to sever the lengths prior to complete setting of the plastic material. One mode of accomplishing this result is by means of the gate 109, heretofore merely generally referred to. In the example selected, this function is accomplished by gate 109, there being preferably one gate for each compound nozzle assembly and passage 76, or alternately, a gate structure common to the plurality of passages 76 and operating transversely thereof.

By reference to Fig. 1 it will be seen that the closure member 90 is somewhat L-shaped in form, and is secured as through a plurality of screws 123, extended into suitable tapped openings therefor in member 75. Member 90 is provided, as heretofore mentioned, with the tapered seating aperture 91 for sealing engagement with the tapered end of member 92, and by reason of this provision the entire structure which is slidably mounted on the bed plate 70, may be moved away from the one or more members 92 for service attention, cleaning, replacement of parts or the like. Member 90 is further secured across its upper margin by a locking bracket 124, secured in place on member 74 as by screw or screws 125. It will appear that between member 90 and the adjacent end faces of members 74 and 75, there is provided one or more spaces each in the nature of a crosshead or guide within which the gate 109 is vertically reciprocably movable, the guideway for the gate being generally indicated at 126. The gate member 109 is provided with a pair of through passages one of which is the passage 108, and the second of which is a similar passage 127. Preferably each of these passages through the gate is of even diameter or other cross section, with passage 76, so that the gate in the position shown in Fig. 1, or in its opposite extreme position, provides for continuity of passage of the material M3 ahead of, through and beyond the gate.

The gate 109 serves as a cutoff or severance element so as to determine the length of the linear plastic body in the extrusion passage beyond the nozzle, which is to be devoted to an individual unit, such as a pencil. The cutoff operation of the gate 109 is effected by the provision of a pair of pins or trunnions each projected horizontally from one side of the gate and one of which appears in Fig. 6 as indicated by the numeral 130. At each side of the gate there is provided a horizontally reciprocable gate-actuating member 131, provided with a pair of diverging cam grooves 132, in and along which operates the adjacent trunnion 130. Reciprocable action of each slide 131, there being preferably at least a pair thereof, is effected through a crank arm 133, pivotally connected at 134 to the member 131, which is constrained to horizontal movement through guides 135. The rod 133 is pivotally connected to a crank pin 136 on a crank disc 140, and the disc rotatably supported by a shaft 141.

Provision for a positive drive of the crank and slide assembly at predetermined periods, is currently shown as consisting of a motor 142 supplied from a line 143, in one leg of which is a switch 144.

Reference has heretofore been made to the general nature and one purpose of the flexible band or tape 110. Since the motion of tape 110 directly follows the movement of the body of plastic in its advance through passage 76, advantage is taken of this fact to constitute the tape 110 as one of the elements of a flow gauge, or linear gauging means to determine the time of cutoff actuation of gate 109. For this purpose tape 110 is provided with one or a plurality of projections 145 extending depthwise of passage 111, it being noted in passing that each projection 145 is of just a depth and area so that in its movement through passage 111, it serves at all times to keep the passage clear of any accumulated plastic or other materials.

The timing of this assembly is such that as each of the one or more elements 145 engages the switch 144 (Fig. 1) the circuit to motor 142 is completed and held closed for a sufficient interval to actuate the gate 109 through a complete stroke in one direction, and in so doing there obviously results a severance of or interruption in the passage 76. It will be noted however that the gate serves to remove from the passage, a short core or slug of the plastic material which, as shown in Fig. 1 occupies the opening 108. This slug is expelled to the right (Fig. 1) into one of a pair of scavenging passages 146. Suitable means for keeping the conduits 146 clear of the accumulation resulting from the short cores or slugs, may consist of a small screw or the like (not shown) operating in each passage.

In the production of lead pencils it is obviously desirable to avoid added operations heretofore required for the application say of a ferrule and eraser element to the head of the pencil body. According to the present method and structural improvements, advantage is taken of the reciprocal action of gate 109 and the provision of the paired passages 108 and 127 in the gate, to utilize the gate as a charging device for individual eraser elements whereby to bring them, one at a time, into the forming bore 76 and into alignment with this passage just following the cutoff operation described. The eraser elements are preferably just slightly smaller in diameter than the short passages 108—127 so that the erasers may be impelled, one at a time, into one or the other of the passages through the gate, thereafter upon reciprocal movement of the gate, to be brought in the line of flow of the plastic. For this purpose, member 90 is provided with a pair of preferably drilled passages 150 and 151 directed into each of which is a conduit or eraser feed tube 152, each of these tubes containing a string of lightly connected eraser elements 153. The feed tubes 152 and mechanism associated therewith, are omitted from Figs. 4 and 5, in the interest of clarity of illustration of major elements, but these parts are clearly shown by Figs. 1, 6 and 8. It will now be obvious that upon imparting pressure to each of the strings of erasers 153 in a direction to the right (Fig. 1) an eraser element will be impelled into whichever of the passages 108 or 127 is in line with its associated feed passage. At the same time, the eraser feeding movement hereinafter described, will serve to eject the short core or slug of plastic outwardly to the right, into one of the scavenging conduits 146. There will now be described the manner and timing of feed of the eraser units to attain the result above referred to.

It is a preference to rotate the crank disc 140 clockwise as indicated by the arrow (Fig. 6), by means of motor 142, thus resulting in a clockwise rotation of shaft 141. In case two of the eraser magazine conduits 152 are employed, shaft 141 will be provided with a pair of double-tooth gear elements 155 the teeth of one of which are indicated at 154 (Fig. 8). Each of these teeth is of rounded contour and serves, twice each revolution of shaft 141, to engage one of a series of teeth 156 on a rack 157, to one end of which is connected a link 160, and the latter connected to a plunger 161. This plunger operates in a tube 162 which is provided with a longitudinal bottom slot 163, the tube 162 connecting directly with a tube 152 heretofore described. From this it will appear that, through the provision of a pair of gears 155 on shaft 141, these gears being angularly displaced to locate their teeth 90 degrees apart, the effect of each rotation of shaft 141 is alternately to advance, through one eraser length, the respective strings or supplies thereof in the magazine tubes 152. Furthermore, it will have appeared that the timing of gate actuation, and hence of eraser feed action as attained through the cooperative engagement of elements 145 and switch 144, is such that these events are conducted in a definite cycle and are spaced in respect to extent of linear flow of material in passage 76 so that the finished pencil and eraser combinations as ejected from the right hand end of the assembly of Fig. 4, are all of a uniform length. It may here be noted that the assembly is preferably provided with one or a plurality of apron elements 165 at the delivery end of the machine, and disposed in virtually the same plane as the aprons 165, is the upper pass of an off-center conveyor indicated at 166, operating over a roller or pulley 167, and moving in the direction of the arrow (Fig. 4). The conveyor may be utilized to deliver the now-finished units, say through a cooling duct or through a quenching zone and thence to a suitable situs of further drying or setting if necessary, thence to a packaging station.

In certain installations it is desirable to preclude any reverse movement of rack 157, as might occur because of the inherent compressibility of the string of eraser elements, in case the appropriate gate passage is not exactly aligned with passage 150 or 151. Any such reverse rack movement is precluded by a pawl 168, pivoted to a stationary element of the assembly as through a pin 169, a suitable small torsion spring 169A being carried by the pin 169 and mounted to bias the pawl point toward the teeth of rack 157.

The function and method identified with the apparatus of Figs. 1 through 6 have been explained heretofore in the course of description of parts, their inter-relation and function, and hence the operation is now thought to be fully apparent.

It will have appeared from Fig. 1 that the form of eraser employed in connection with the present method of eraser attachment and pencil assembly, has been particularly adapted to avoid any necessity of a separate ferrule or like eraser-holding element. To this end, each of the eraser units 153 is preferably formed as shown on an enlarged scale by Fig. 9, with an external circumferential mortise undercut or shoulder portion 170, the undercut nature of this peripheral groove being such that this reduced end of eraser 153 becomes embedded in and firmly embraced by a collar or annulus formed of the adjacent body of the plastic M3. Further keying securement between the eraser 153 and the pencil body is preferably provided for by provision of a chamber 171 internally of the anchored end of the eraser, and a connecting neck 172 between the bulbous chamber 171 and the body of the pencil. The pressure on the material M3 in the forming passages beyond the nozzle, is sufficient to cause the material to enter the spaces 170, 171 and 172, to displace the air from these spaces and upon setting of the plastic, firmly to anchor the eraser to the resulting pencil body, thus obviating any necessity for a separate plastic or metal ferrule portion.

It is preferred that chambers 171 and 172 be made considerably larger in diameter than the extruded material M—4, so that the resulting stem of material in these chambers consists in great part of the material M—3.

The next preceding portion of the description has made particular reference to the manufacture of plastic lead pencils, but it should be particularly noted that the method is readily adaptable, with or without merely minor changes, to the formation of other elongate articles provided in predetermined lengths or in indefinite stock lengths, particularly those products which are detachably assembled by fittings of various sorts in the nature say of metal inserts. One example of a now-obvious extension of this technique is indicated by Fig. 7 wherein there is shown fragmentary lengths of a plastic tubing which is initially extruded or cored so as to exhibit an annular section. In such a structure, only a single extrusion nozzle need be employed, and extrusion is effected over say a core element located in the approximate position of member 106 (Fig. 1), which may and usually would be of some greater relative diameter than the member 106. In the structure of Fig. 7 the tubing 180 is shown as consisting of connected lengths in the finished article, a fluid-tight and structurally secure connection between which is effected through a female connection 181 and a male connection 182 threaded in the zone 183. Each of the connections 181 and 182 is provided with a thin roughened prolongation 184 which constitutes an integral extension of the associated connection. In the production of a plastic tube and coupling assembly of this sort, the coupling elements 181 and 182 will be alternately inserted into the forming passageway by the alternate introduction, in ensuing operations of the gate 109, of the male and female connections. In this case one of the tubular magazines 162—152 may be employed solely for male connections, and the opposite magazine for female connections, whereby there is provided for the alternate insertion of the two types of connection at opposite ends of each defined length or unit of tube section.

It has been determined as desirable in the interest of minimizing finishing operations, when utilizing certain types of plastic materials, to coat or mask the insert elements such as the eraser units 153 or pipe coupling units 181 and 182. This may be done either by a readily removable covering material of sheet form, or by application of a liquid exteriorly of the insert units of such nature as to prevent adherence of the plastic material to the surfaces of the added elements.

Although the invention has been described by making detailed reference to but a few applications of the method and modifications of the apparatus, the detail of description is to be understood solely in an instructive and not in any limiting sense, many variants being possible within the scope of the claims hereunto appended.

I claim as my invention:

1. In a device for forming and coating an elongate plastic article, an extrusion nozzle, means for supplying a plastic setting material under pressure through said nozzle, a passage beyond the nozzle, a conduit directed into said passage and connected to a source of a coating material, and a check valve in the zone of connection of said conduit to said passage.

2. In a device for the extrusion formation of rod-like elements consisting at least in part of a plastic material, a feed nozzle, means for supplying the feed nozzle with a plastic material under pressure, a passageway beyond the nozzle, a cutoff element movable across the line of flow of said material and operating through a portion of said passageway, and means for causing effective operation of said cutoff element, in response to a predetermined extent of linear movement of the plastic material through said passageway, said means including an endless member movable through a portion of said passageway and conforming in rate of movement, to that of the material in the passageway.

3. In apparatus for forming a rod-like plastic article and inserting a permanent element into the article, a nozzle, means for supplying plastic material through the nozzle under pressure, a passageway beyond the nozzle, a member movable crosswise of the passageway and constituting a carrier for one or more insert elements, and means for periodically actuating said movable member to bring an insert element into the line of flow through said passageway.

4. In apparatus for forming, and applying a permanent insert element into a rod-like plastic article, a nozzle, means for supplying plastic material through the nozzle under pressure, a passageway beyond the nozzle, a member movable transversely through the passageway and constituting a carrier for one or more insert elements, means for actuating said movable member to bring an insert element into the line of flow through said passageway, and means operable responsively to the flow of material through a given length of said passageway, to effect operation of said actuating means and member.

5. In plastic extrusion apparatus for forming a composite elongate article, an extrusion nozzle, means for supplying the nozzle with a plastic material under pressure, a passage beyond the nozzle, and a combined cutoff gate and charging device for insert elements, arranged for movement substantially crosswise of the passageway, and adapted to interrupt the flow of plastic material therethrough, and to bring an insert element into the flow of material in said passage.

6. In plastic extrusion apparatus for forming a composite elongate article, an extrusion nozzle, means for supplying the nozzle with a plastic material under pressure, a passageway beyond the nozzle, and a combined cutoff gate and charging device for insert elements arranged for movement substantially crosswise of the passage, the gate adapted periodically to interrupt the flow of plastic material therethrough, and to bring an insert element into the line of flow in said passageway, and means for causing an effective actuation of said gate element, in response to a predetermined extent of movement of the plastic material through said passageway, said gate element being formed and normally positioned to permit a substantially uninterrupted flow through the passageway between the periods of said interruption of flow.

7. The herein described method of forming a lead pencil and eraser structure, which consists in simultaneously extruding into a common forming passageway, a self-hardening plastic material to form the body of the pencil and a plastic material to constitute the core or writing element of the pencil, in the form of a material of self-hardening characteristics, and periodically, responsive to a predetermined length of flow of the pencil forming materials through said passageway, introducing transversely into said passageway, an eraser element, and keying the eraser element to the body of plastic in the passageway while the body is in plastic state.

8. The herein described method of forming a lead pencil and eraser structure, which consists in simultaneously extruding into a common forming passageway, a hardening plastic material to form the body of the pencil, and extruding into said passageway a plastic material to constitute the core or writing element of the pencil, in the form of a material of self-hardening characteristics, and periodically, responsive to the length of flow of the pencil forming materials through said passageway, introducing into said passageway, an eraser element, keying the eraser element to the body of plastic in the passageway while the body is in plastic state, and timing the insertion of said eraser element into said passageway, responsively to length of flow of the pencil body-forming material in said passageway.

9. An eraser assembly including a holding and manipulating body of a hardened thermo plastic material, and an eraser having a recess opening adjacent the plastic body, the plastic of the body extended into permanent interlocking and bonded relation to the material defining said recess and constituting a means of securement of the eraser to the pencil body, the body having a recess at its end adjacent the eraser and the eraser being peripherally undercut to fit into the last said recess and being formed to constitute a mortise-type joint through which the manipulating body and the eraser are permanently bonded.

10. In a multiple extrusion apparatus for plastic materials, an inner nozzle, an outer nozzle, means forming coaxial passageways for the materials extruded by the nozzles, means providing distinct sources of supply of plastic materials under pressure and serving to direct the materials toward and through the respective nozzles, said passageway forming means including an extension of the inner nozzle, proxiding an elongate thread-like passage therefrom extending a substantial length beyond the inner nozzle in the direction of extrusion flow of material therefrom, the last said passage being of even diameter beyond the inner nozzle, and the inner nozzle extension being an element of even external diameter, a reciprocal cutoff element adapted to work across and constitute a substantial length of the passageway beyond the outer nozzle, and located in the region of discharge of the passage-forming element extended from the inner nozzle.

11. In a device for forming and coating an elongate plastic article, an extrusion nozzle, means for supplying a plastic material under pressure through said nozzle, a passage beyond the nozzle, a conduit directed into said passage and connected to a source of coating material, and a check valve arranged to control the supply of coating material from said conduit to said passage.

12. In a device for forming an elongate article by extrusion of a plastic, a nozzle, means for supplying the nozzle with a plastic material under pressure, a conduit beyond the nozzle for receiving the extruded material, a member movable crosswise of the conduit and arranged periodically to sever the material in said conduit, and a flow gauge for controlling the operation of the severing member, said flow gauge including an endless flexible member movable with the plastic in said conduit and provided with a projection interengaging the plastic in the conduit whereby the flexible member is positively impelled by and coordinated with the movement of plastic in the conduit, and means coacting with the endless flexible member, to control the actuation of the cutoff member.

13. The combination and arrangement of elements as recited by claim 12, but further characterized in that the endless flexible member is provided with driving means including an electric motor, and a switch in circuit with said motor arranged to be actuated at regular intervals, by the endless flexible member.

14. In apparatus for forming elongate articles by plastic extrusion, a nozzle, means for supplying the nozzle with a plastic material under pressure, a conduit beyond the nozzle for receiving material extruded therefrom, a member movable crosswise of the conduit and arranged periodically to sever the plastic material in said conduit, a flow gauge for controlling operation of the severing member, the flow gauge including an endless flexible tape, movable with and positively impelled by the plastic in said conduit, and one or more projections on said tape adapted for interengagement with the plastic material in said conduit.

15. The combination and arrangement of elements as recited by claim 14, but further characterized by the addition of means providing an endless course or passage for the flexible tape such that the tape first enters then emerges from a portion of said conduit, and valve means in the zone of entrance of the tape to the conduit, and adapted to prevent escape of the plastic material in said zone.

16. In plastic extrusion apparatus for forming an elongate article, an extrusion nozzle, means for supplying the nozzle with a plastic material under pressure, a conduit beyond the nozzle, and a combined cutoff gate and charging device for insert elements, said device being arranged for movement substantially crosswise of the conduit, and being provided with a plurality of pockets adapted to serve, upon reciprocal movement of the gate and device, for periodic introduction of an insert element and substantially concurrent removal of a length of the material in the conduit which is comparable in volume to that of the insert.

17. In apparatus for forming an elongate article by plastic extrusion, an extrusion nozzle, means for supplying the nozzle with a plastic material under pressure, a conduit beyond the nozzle, a combined cutoff gate and charging device for insert elements, said device being arranged for movement transversely of the conduit, and adapted at times to interrupt the flow of plastic material therethrough, and at other times to bring an insert element into the flow of material in said conduit, the gate and charging device being characterized by a plurality of bores transversely therethrough, each of the bores being substantially parallel to the axis of the conduit, and spaced apart a distance corresponding substantially to the stroke of movement of the device across the conduit, and means for causing a reciprocal movement of said gate and charging device in response to a definitely predetermined extent of flow of the extruded material in said conduit.

18. The herein described method of forming, as a subtantially continuous process, capped, cored, rod-like elements, each of predetermined length, which method consists in simultaneously extruding into a common forming passageway, a self-hardening plastic material to form the bodies of the elements, and a plastic material to constitute the cores of the elements, in the form of a material of self-hardening characteristics, and periodically, responsive to a predetermined length of flow of the body-forming materials through said passageway, introducing a cap element into said passageway, keying the cap element to the body of plastic in the passageway while the body is in plastic state, and timing the insertion of said cap element into said passageway, responsively to length of flow of material forming the bodies of the elements, in said passageway.

19. In plastic extrusion apparatus for forming an elongate article, an extrusion nozzle, means for supplying the nozzle with a plastic material under pressure, a conduit beyond the nozzle, and a combined cutoff gate and charging device for insert elements, said device being arranged for movement in a direction to intersect the flow of material in the conduit, and being provided with a plurality of pockets adapted to serve, upon movement of the gate and device, for periodic introduction of an insert element and substantially concurrent removal of a length of the material in the conduit which is comparable in volume to that of the insert.

20. In a multiple extrusion apparatus for plastic materials, an inner nozzle, an outer nozzle, means forming coaxial passageways for the materials extruded by the nozzles, means providing distinct sources of supply of plastic materials under pressure and serving to direct the materials toward and through the respective nozzles, said passageway-forming means including an extension of the inner nozzle, providing an elongate thread-like passage therefrom, extending a substantial length beyond the inner nozzle in the direction of extrusion flow of material therefrom, the last said passage being of uniform cross-sectional areas and shaping beyond the inner nozzle, and the inner nozzle extension being an element of uniform external shape and cross-sectional areas, a cutoff element adapted to work across and constitute a substantial length of the passageway beyond the outer nozzle, and located in the region of discharge of the passage-forming element extended from the inner nozzle.

THEODORE L. JOHNSON.